UNITED STATES PATENT OFFICE 2,390,411

SULPHONYL CYANAMIDES

George W. Anderson, Stamford, and Richard O. Roblin, Jr., Old Greenwich, Conn., assignors to American Cyanamid Company, New York, N. Y., a corporation of Maine No Drawing. Application August 6, 1941, Serial No. 405,687

1 Claim. (Cl. 260—397.7)

This invention relates to p-substituted benzenesulphonyl cyanamides and more particularly to p-amino benzenesulphonyl cyanamide.

In the past a number of sulphonamide compounds have been prepared by the reaction of various benzene sulphonyl halides with amines, the basic amino group reacting with the halide to produce a sulphonamide compound. We have found that in spite of the fact that the amido group in cyanamide is definitely acidic, forming stable salts with sodium, calcium, and the like, nevertheless it is possible to prepare sulphonyl compounds therefrom.

According to the present invention a p-nitro or p-acylamino benzene sulphonyl halide is reacted with free cyanamide, preferably in the presence of an acid-binding agent and the corresponding sulphonyl cyanamide is obtained, or in the case of strong acid-binding agents, such as sodium hydroxide, the sodium salt thereof. This compound can be readily reduced to the amino compound which can be obtained in the free state. The products are useful as dyestuff intermediates and the amino compounds show low toxicity when introduced into the blood stream of animals.

The invention will be described in greater detail in conjunction with the following specific examples which are typical illustrations but it should be understood that the invention is not limited to the exact details therein set forth. The parts are by weight.

EXAMPLE 1

*Sodium p-nitrobenzenesulphonylcyanamide*

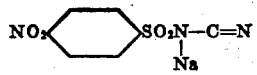

56 parts of 95% NaOH were dissolved in 175 parts of water, cooled and 32 parts of 95% NH$_2$.CN dissolved in the NaOH solution.

To the solution above was added 148 parts of p-nitrobenzenesulphonyl chloride with stirring. The reaction began when the mixture was brought up to 30° C. The temperature was maintained between 35°–45° C. during the addition of acid chloride. The slurry reaction product was stirred one hour after addition, and cooled to precipitate sodium p-nitrobenzenesulphonyl cyanamide as a hydrate. It was filtered off and redissolved in 125 parts of water at 50° C. The insoluble material was removed by filtration and the solution cooled to precipitate the product.

After drying, the product was dissolved in acetone, the insoluble material filtered off and the product thrown down with petroleum ether. It was usually necessary to redissolve in acetone and stir with decolorizing carbon before obtaining an almost white product.

EXAMPLE 2

*Sulphanilyl cyanamide*

A reducing mixture was prepared by adding 80 parts of 5% acetic acid to 11.3 parts of iron dust. After the initial reaction had subsided, 15 parts of sodium-p-nitrobenzenesulphonyl cyanamide prepared as described in Example 1, were added in several portions. There was an immediate heat of reaction during this addition. After the spontaneous reaction was spent, the slurry was warmed on a steam bath for 1 hour.

The slurry was then diluted with water, made alkaline with NaOH solution, and filtered. The filtrate yielded light yellow crystals when made strongly acid with HCl. This precipitate was suspended in water and made neutral with NaOH to the point where the precipitate just dissolved. At this point it is important that the solution be slightly acid, because only on the acid side can the solution be clear up with decolorizing carbon. The solution then yielded pure sulphanilyl cyanamide (M. P. 292°–295° C.) when acidified with HCl.

EXAMPLE 3

Crude calcium cyanamide (220 parts of minimum hydrated) was stirred in 1300 parts of water for three hours at room temperature. The mixture was then filtered.

200 parts of acetylsulphanilyl chloride was then stirred into 1040 parts of the above filtrate at 25°–30° C. over a period of 45 minutes. Toward the end of the reaction the solution was kept alkaline by adding 40% NaOH. The acetylsulphanilyl chloride dissolved completely after the addition, and the cyanamide compound precipitated slowly while being stirred for 1½ to 2 hours. The solution was then cooled and filtered. The precipitate was washed with a little cold water and then washed well with acetone to remove any acid chloride present. 162 parts of white crystalline product were obtained.

EXAMPLE 4

*Sulphanilyl cyanamide*

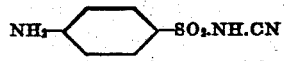

5 parts of the product prepared as described in Example 3 were refluxed with 30 parts of 10%

NaOH for five minutes and then filtered while hot.

The cooled filtrate was made strongly acid with concentrated HCl, precipitating white crystals of practically pure sulphanilyl cyanamide.

The hydrogen of the sulphonamide group is strongly acidic and reacts in general to form salts with almost any metal. Thus, for example, if in the production of the nitro compound the sodium hydroxide is replaced by potassium hydroxide, calcium hydroxide, and the like, the corresponding salts can be prepared. From the alkali metal salts of either the nitro or amino compounds other metal salts can be prepared by double decomposition. For example, the copper salt can be prepared by reacting the sodium salt of the nitrobenzene sulphonyl cyanamide or sulphanilyl cyanamide with cupric chloride or other cupric salt and in a similar manner the silver salt can be prepared by using silver nitrate.

In the foregoing examples the acetylamino benzene sulphanilyl cyanamide is described. For practical purposes the acetylamino compound is the cheapest and is preferred but other acylamino compounds such as benzoylamino and propionylamino may be used.

The present invention is in part a continuation of our copending application Serial No. 366,274 filed November 19, 1940, now Patent 2,259,721.

We claim:

Sulphanilyl cyanamide.

GEORGE W. ANDERSON.
RICHARD O. ROBLIN, Jr.